Figure 1:
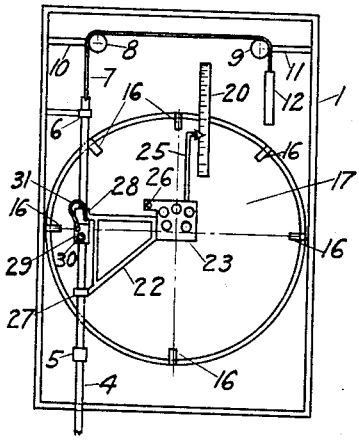

H. C. ALGER.
RECORDER.
APPLICATION FILED MAR. 2, 1914.

1,131,892.

Patented Mar. 16, 1915.

WITNESSES
A. G. Ruthrauff.
J. E. Dischinger.

INVENTOR
Harley C. Alger

UNITED STATES PATENT OFFICE.

HARLEY C. ALGER, OF CHICAGO HEIGHTS, ILLINOIS.

RECORDER.

1,131,892.  Specification of Letters Patent.  Patented Mar. 16, 1915.

Application filed March 2, 1914. Serial No. 821,982.

*To all whom it may concern:*

Be it known that I, HARLEY C. ALGER, a citizen of the United States, residing at Chicago Heights, in the county of Cook and State of Illinois, have invented a new and useful Recorder, of which the following is a specification.

My invention relates to recorders of the type which record or register or indicate a rate which may vary or by performing an integration depending upon the rate and time thereby giving a total quantity which depends upon the rate and the time.

This invention may be used wherever it is desired to perform such a service as is often the case in the measurement of water or other liquids, although other uses of my invention will be evident and I do not wish to confine myself to this particular service.

With devices of this character, usually the rate to be recorded or registered is a function of some factor such as the head or pressure or the like which is more conveniently measured and it often happens that the rate is not in simple proportion of such factor but may vary, for example,—as a root, or a power of the factor; moreover, in devices of this character, it is preferable that the results be recorded by a pointer or stile upon a recording surface such as a scale or chart which shall have uniform graduations or upon which equal divisions represent equal rates or quantities. In order to obtain such results it has heretofore been necessary to use a cam, or distorted spiral or helix or other mechanism to correct the motion which may be obtained from the original factor thereby giving a motion which is in simple proportion to the factor and representing a rate upon a scale which may have uniform graduations. It has been necessary to do this also because of the integrator which is usually a counter driven by a friction wheel which moves over the surface of a flat disk, or recording surface. In such cases the disk or recording surface is usually driven by clockwork, the wheel receiving motion from the disk in proportion to its distance from the center of the disk. The integrator, or counter, is then driven in proportion to the rates at all times thereby registering a total quantity even though the original factor is not a constant proportion of the rate, but the use of such a cam, spiral or the like complicates the mechanism, adds to its cost and often renders the results unsatisfactory.

One object of my invention is to construct a device of this character which shall be accurate and efficient, another object is to construct such a device which will indicate upon a scale or chart having uniform graduations while still another object is to construct such a device which shall be simple and of few parts.

These objects I attain by providing an indicating member comprising a scale, chart or disk which projects away from the line of motion transmitted from the factor so that the pointer, stile or friction wheel moving in one direction as the original factor varies will move over a larger or smaller surface of the scale, chart or disk thereby registering a value, which is not equal to the movement of the pointer, stile or friction wheel but which is a function of such movement and by constructing the pointer, stile or friction wheel so that it is movable in another direction and is pressed toward the projecting scale, chart or disk.

Figure 2:
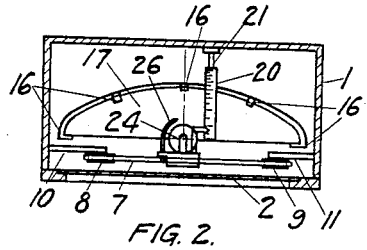
Figure 3:
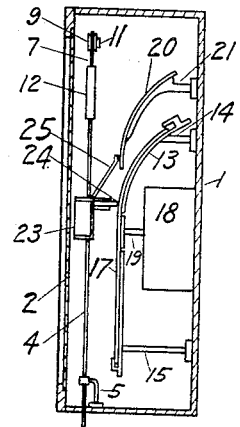
Figure 7:
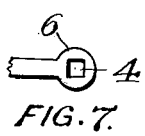
Figure 6:
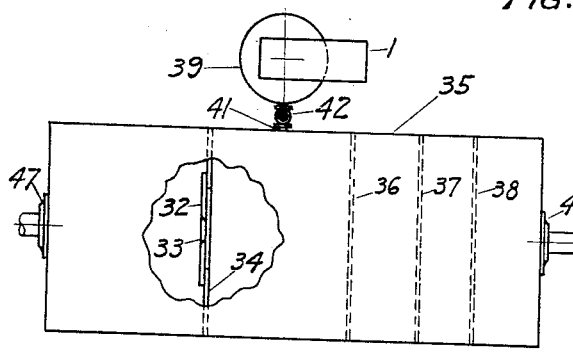
Figure 4:
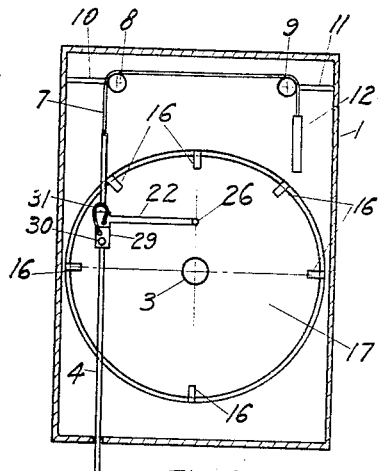
Figure 5:
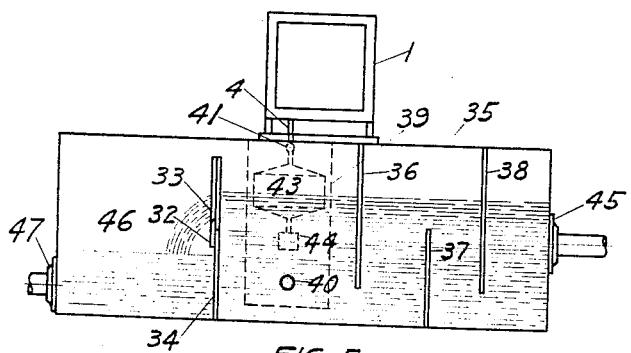

Referring to the accompanying drawing, Figure 1 shows a front elevation, with cover removed, of a device embodying my invention; Fig. 2 shows a plan view of Fig. 1; Fig. 3 shows a side view of Fig. 1; Fig. 4 shows a front elevation of a modified form of my invention; Fig. 5 shows a side elevation of one application of my invention for the purpose of registering the flow of water or other liquid; Fig. 6 shows a plan view of Fig. 5, while Fig. 7 shows a detail of construction.

In the accompanying drawing, 1 represents a suitable case for containing the mechanism of a register embodying my invention. The case may have a glass door 2, as shown in Figs. 2 and 3, a rod 4 is adapted to slide lengthwise in suitable supports 5 and 6. The rod should be made square as shown more clearly in Fig. 7 or other suitable means may be provided to prevent its turning in the supports.

A flexible cable or band 7 is attached to the upper end of the rod 4 and passes over pulleys 8 and 9 which are held by suitable supports 10 and 11 and the cable 7, has a weight 12 attached at its other end so that the cable is held taut. The use of the cable and weight is optional as in many cases it may not be required. Motion may be transmitted to the rod in a lengthwise direction as the original factor varies operating an index pointer, a stile, or integrating mechanism thereby.

A projecting plate 13 held by suitable supports 14 and 15 and having lugs 16 thereon is adapted to hold a chart, disk or other member 17.

Suitable clock work 18 is mounted within the case 1 and drives a spindle 19.

The chart 17 may be glued or otherwise attached to the end of the spindle 19, which may be flattened as shown in Fig. 3, thus causing the chart to revolve at the same time being held in a projected or curved position, as shown in Fig. 3. The surface of the chart is curved with elements substantially parallel to a line perpendicular to the axis about which the chart revolves. A scale 20 held by a suitable support 21 and of a shape similar to the projecting surface 17 may be used to indicate a value thereon.

Heretofore in constructing devices of this character where it is desired to record some function of the movement of the float as a power or a root of that movement, it has been necessary to correct the movement transmitted by the float by using a cam spiral or helix or some similar device which alters the movement received from the float and transmits a power or root of this movement to a stile that records upon the chart which may then have uniform graduations. In my invention, however, I provide a chart which is curved or which projects or extends away from the line of movement of the stile so that the stile may be moved by the float without the use of cams or the like. The stile is carried so that it may swing freely and maintain contact with the chart and a movement from the float causes a greater relative movement of the stile over the surface of the chart due to the curvature of the chart. The value recorded may thus be some function of the movement of the float without the use of cams and like devices.

A carriage 22 operated by the rod 4 carries a counter or integrating mechanism 23 which has a friction wheel 24, Figs. 2 and 3, for operating the mechanism of the counter, the friction wheel 24, receiving motion from the revolving chart 17. A pointer 25 extending from the counter mechanism may indicate upon the scale 20, a stile 26 is also attached to the counter mechanism and preferably curved so that the end of the stile meets the chart 17 near the point where the friction wheel 24 meets the chart 17. The carriage 22 may be secured to the rod 4 by suitable bosses 27 and 28 which should be free to move about the rod 4 as an axis.

A set collar 29 is rigidly secured to the rod 4 by means of a set screw 30 and holds the carriage 22 in its proper vertical position.

A suitable spring 31 may be secured to the boss 28 and to the set collar 29, the spring being under slight compression so that it tends to turn the carriage about the rod 4 holding the friction wheel 24 against the chart 17 and maintaining the stile 26 against the chart 17 and also the pointer 25 in its relative position with reference to the scale 20.

In Fig. 4, a mechanism which records only is shown, wherein the carriage 22 and the stile 26 is further simplified. In this figure the rod 4 is shown without guides, which construction may be used, especially where a flat band 7 is used which will hold the rod 4 so that it will not turn against the slight action of the spring 31.

In the construction shown in Fig. 4 it is not necessary that the stile shall move to the center of the chart 17 as the zero line may be a circle near the center as shown at 3.

In Fig. 5, which shows one application of my invention for the purpose of registering the flow of water or other liquid, 32 represents a weir plate having weir or notch 33 therein for the purpose of measuring water. The weir plate 32 is mounted in a partition 34 of a weir box 35, which may have baffles 36, 37 and 38 therein. A float pot 39 may be located in a convenient position and connected to the weir box 35 by means of pipes 40 and 41 so that the water level within the float pot 39 is the same as the water level in the weir box 35 on the supply side of the weir 33. A valve may be connected in the pipes 40 and 41, a valve 42 in pipe 41 being shown in Fig. 6. By throttling these valves the water level within the float pot 39 will not fluctuate as greatly as the water level within the weir box 35 although the average level will be the same. A float 43 is mounted within the float pot 39 and has a weight 44 attached to rod 4 to insure stability of the float and regulate the distance which the float sinks in the water. The rod 4 is attached to the top of the float 43 and extends into the case 1 operating the mechanism, as previously described.

Water enters the inlet 45 and after being baffled so that the water within the weir box 35 is quiet may pass through the weir 33 into a storage chamber 46 and from the storage chamber 46 may be drained through the outlet 47 for any purpose desired. The quantity of water passing through the weir 33 will depend upon the height or head of water above the zero level and this movement of water level will be transmitted to the mechanism through the rod 4 as the water level varies. The movement of the rod 4 and the vertical movement of the pointer 25, the stile 26 and the registering wheel 24 which move with the rod 4 will be in proportion to the head of water above the zero level. The quantity of water flowing, however, may not vary in proportion to the head but may vary as some function of the head,—for example, if the weir is a rectangular weir or slot, the quantity of water flowing will vary in proportion to the one and one-half power of the head. By providing the surface 17 or scale 20 of a shape projecting from the line of movement of the float rod 4, it will be seen that a movement of the float rod causes a greater movement of the pointer 25, the stile 26, or registering wheel 24 on its corresponding registering surface and by proper proportion of the parts, the projecting surface may be made such that the quantity of water flowing through the weir is registered and the graduations upon the scale or registering surface may be uniform and equal distances thereon may represent equal quantities of water.

It is evident that various other applications of my invention may be made and I do not wish to confine myself to the particular use above described.

What I claim as my invention and desire to secure by Letters Patent, is as follows:—

1. In a device of the character described, an indicating member having uniform graduations thereon, means for indicating upon the indicating member and means for producing relative movement between the indicating member and the indicating means, said indicating member being projected away from the line of motion of the indicating means whereby a function of said movement is indicated.

2. In a device of the character described, a recording chart, means for recording thereon and means for producing relative movement between the recording means and the recording chart, said recording chart being projected away from the line of motion of the recording means whereby a function of said movement is recorded.

3. In a device of the character described, a register, a revoluble member, means for receiving motion from the member to operate the register and means for producing relative movement between the member and said motion receiving means, said member being projected away from the line of motion of said motion receiving means whereby a function of said movement is registered.

4. In a device of the character described, an indicating member having uniform graduations thereon, means for indicating upon the indicating member and means for producing relative movement between the indicating member and indicating means, said indicating member being curved away from the line of motion of the indicating means whereby a function of said movement is indicated.

5. In a device of the character described, a recording chart, means for recording thereon and means for producing relative movement between the recording means and the recording chart, said recording chart being curved away from the line of motion of the recording means whereby a function of said movement is recorded.

6. In a device of the character described, a register, a member revolubly mounted upon an axis, means for receiving motion from the revoluble member to operate the register and means for producing relative movement between the member and said motion receiving means, said member having a curved surface with elements substantially parallel to a line perpendicular to said axis, said surface extending away from the line of motion whereby a function of the movement is registered.

7. In a device of the character described, a curved member revolubly mounted upon an axis, a register, means for receiving motion from the member to operate the register, means for moving said motion receiving means with respect to said member, said member having a curved surface with elements substantially parallel to a line perpendicular to said axis, said surface curving away from the line of motion whereby a function of the movement is registered.

8. In a device of the character described, means forming a curved movable surface, a register, means adapted to move over the surface and to receive motion therefrom to operate the register, said surface being curved away from the line of motion of the moving means in the direction of said line of motion whereby a function of the movement is registered.

9. In a device of the character described, a curved revoluble recording chart, means for recording thereon and means for producing relative movement between the recording means and the recording chart, said recording chart being curved away from the line of motion of the recording means whereby a function of said movement is recorded.

10. In a device of the character described, a recording chart, a carriage, means attached to the carriage for recording upon the chart, a register, means carried by the carriage for receiving motion from the chart to operate the register and means for producing relative movement between said carriage and chart, said chart being curved away from the line of motion of the carriage whereby a function of said movement is recorded and registered.

HARLEY C. ALGER.

Witnesses:
A. G. RUTHRAUFF,
I. E. DISCHINGER.